(12) United States Patent
Riviere et al.

(10) Patent No.: US 7,735,226 B2
(45) Date of Patent: Jun. 15, 2010

(54) STRUCTURAL ELEMENT FOR A MOTOR VEHICLE, CORRESPONDING MOTOR VEHICLE, AND METHOD FOR PRODUCING ONE SUCH STRUCTURAL ELEMENT

(75) Inventors: Caroline Riviere, Valentigney (FR); Sébastien Berne, Luze (FR)

(73) Assignee: Faurecia Bloc Avant, Nanterre (FR)

( * ) Notice: Subject to any disclaimer, the term of this patent is extended or adjusted under 35 U.S.C. 154(b) by 178 days.

(21) Appl. No.: 11/887,925

(22) PCT Filed: Apr. 5, 2006

(86) PCT No.: PCT/FR2006/000751

§ 371 (c)(1), (2), (4) Date: Oct. 22, 2007

(87) PCT Pub. No.: WO2006/106230

PCT Pub. Date: Oct. 12, 2006

(65) Prior Publication Data

US 2009/0026806 A1    Jan. 29, 2009

(30) Foreign Application Priority Data

Apr. 7, 2005    (FR) .................................. 05 03489

(51) Int. Cl.
*B21D 53/88*    (2006.01)
*B62D 25/08*    (2006.01)
*B62D 27/02*    (2006.01)

(52) U.S. Cl. .............. 29/897.2; 296/193.09; 296/193.1; 296/187.09; 296/29; 296/187.01; 403/67; 428/583

(58) Field of Classification Search ............ 296/193.09, 296/193.1, 187.09, 203.02, 29, 30, 187.01; 29/897.2; 403/267; 148/526; 428/582, 586
See application file for complete search history.

(56) References Cited

U.S. PATENT DOCUMENTS

| 5,658,041 | A  | * | 8/1997  | Girardot et al. ........ 296/193.09 |
| 6,131,897 | A  |   | 10/2000 | Barz et al.            |
| 6,216,810 | B1 | * | 4/2001  | Nakai et al. ................ 180/68.4 |
| 6,273,496 | B1 | * | 8/2001  | Guyomard et al. ..... 296/193.09 |
| 6,387,533 | B1 | * | 5/2002  | Ast et al. ..................... 428/582 |

(Continued)

FOREIGN PATENT DOCUMENTS

DE    196 18 626 A1    11/1997

(Continued)

*Primary Examiner*—Jason S Morrow
(74) *Attorney, Agent, or Firm*—Young & Thompson

(57) ABSTRACT

A structural element includes: at least one hollow metallic body (4) with a closed cross-section, an external surface (24), and at least one adhesion lug (22) formed on the external surface (24); and at least one plastic body (6) which is moulded over the metallic body, covering the external surface (24) of the metallic body in such a way as to at least partially cover the adhesion lug (22) in order to connect the plastic body (6) to the metallic body (4). According to one aspect of the invention, the adhesion lug (22) protrudes over the external surface (24) of the metallic body (4), the adhesion lug (22) being closed, connected to the metallic body (4), and having an undercut (40) in relation to the external surface (24) of the metallic body (4). The inventive structural element can be applied to the front of motor vehicles.

3 Claims, 5 Drawing Sheets

U.S. PATENT DOCUMENTS

| | | | |
|---|---|---|---|
| 6,401,509 B1 * | 6/2002 | Amborn | 72/62 |
| 6,464,289 B2 * | 10/2002 | Sigonneau et al. | 296/193.09 |
| 6,619,419 B1 * | 9/2003 | Cheron et al. | 180/311 |
| 6,644,722 B2 * | 11/2003 | Cooper | 296/187.02 |
| 6,679,545 B1 * | 1/2004 | Balzer et al. | 296/193.09 |
| 6,715,573 B2 * | 4/2004 | Emori et al. | 180/68.4 |
| 6,729,424 B2 * | 5/2004 | Joutaki et al. | 180/68.4 |
| 6,752,451 B2 * | 6/2004 | Sakamoto et al. | 296/187.03 |
| 7,073,848 B2 * | 7/2006 | Lee | 296/193.09 |
| 7,152,896 B2 * | 12/2006 | Roeth et al. | 296/30 |
| 7,182,545 B2 * | 2/2007 | Riviere et al. | 403/267 |
| 7,185,946 B2 * | 3/2007 | Cate et al. | 296/193.09 |
| 7,377,579 B2 * | 5/2008 | Kwon | 296/187.09 |
| 2002/0060476 A1 * | 5/2002 | Cantineau et al. | 296/194 |
| 2002/0160145 A1 * | 10/2002 | Bauhoff | 428/99 |
| 2002/0189797 A1 * | 12/2002 | Moitzheim et al. | 165/120 |
| 2003/0131643 A1 * | 7/2003 | Janssen et al. | 72/55 |
| 2004/0046422 A1 * | 3/2004 | Igura et al. | 296/193.09 |
| 2004/0094975 A1 * | 5/2004 | Shuler et al. | 293/120 |
| 2004/0160088 A1 * | 8/2004 | Staargaard et al. | 296/193.09 |
| 2004/0200550 A1 * | 10/2004 | Pfaffmann et al. | 148/526 |
| 2004/0222670 A1 * | 11/2004 | Andre et al. | 296/193.09 |
| 2004/0258880 A1 * | 12/2004 | Bauhof | 428/119 |
| 2005/0040672 A1 * | 2/2005 | Andre | 296/187.09 |
| 2005/0275248 A1 * | 12/2005 | Lee | 296/193.09 |
| 2006/0117825 A1 * | 6/2006 | Pfaffmann et al. | 72/60 |
| 2007/0035159 A1 * | 2/2007 | Cate et al. | 296/187.09 |
| 2008/0038576 A1 * | 2/2008 | Riviere et al. | 428/586 |
| 2008/0116701 A1 * | 5/2008 | Boumaza et al. | 293/120 |
| 2008/0185872 A1 * | 8/2008 | Povinelli et al. | 296/193.09 |

FOREIGN PATENT DOCUMENTS

| | | |
|---|---|---|
| DE | 198 54 076 C1 | 4/2000 |
| EP | 0 658 470 A1 | 6/1995 |
| WO | 02/068257 A | 9/2002 |

\* cited by examiner

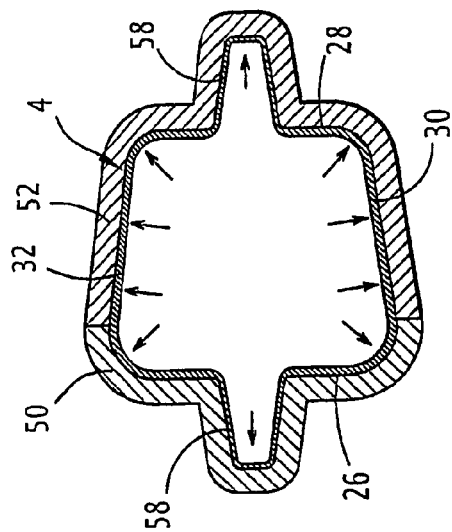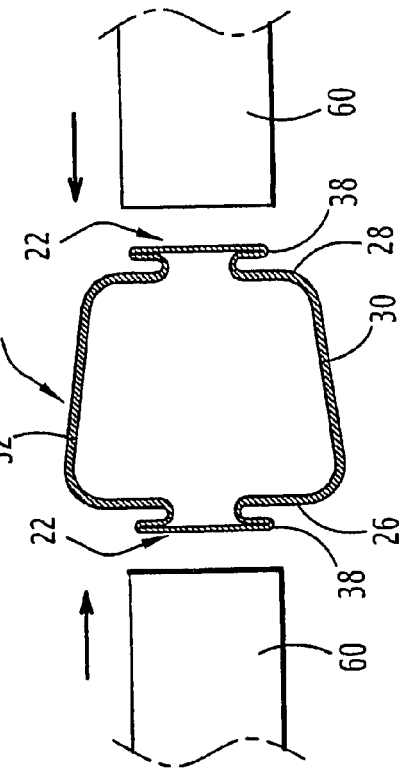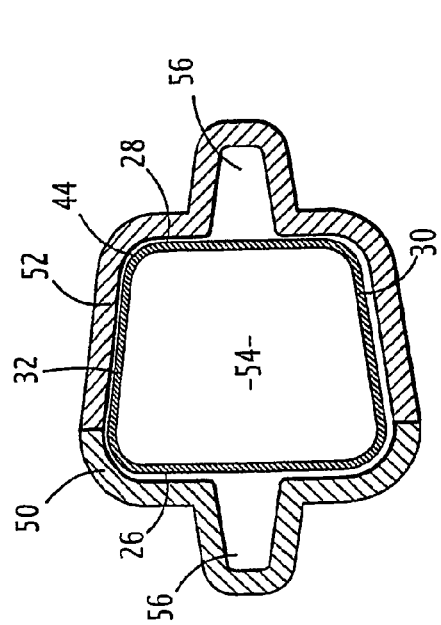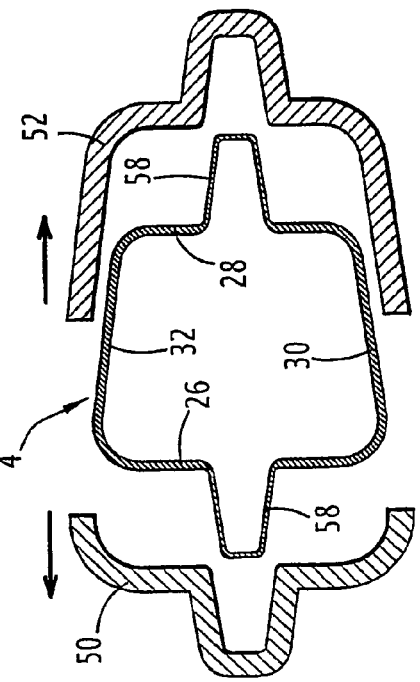

STRUCTURAL ELEMENT FOR A MOTOR VEHICLE, CORRESPONDING MOTOR VEHICLE, AND METHOD FOR PRODUCING ONE SUCH STRUCTURAL ELEMENT

BACKGROUND OF THE INVENTION

1. Field of the Invention

This invention relates to a structural element for a motor vehicle of the type comprising:

- a hollow metal body having a closed cross-section having an external surface and at least one anchor pattern formed on the external surface, and
- a body of plastics material covering the external surface of the said metal body so as to at least partly cover the anchor pattern to connect the plastics body to the said metal body.

Such a structural element is generally referred to as a "hybrid" because of the combined use of metal and plastics.

2. Description of the Related Art

Document WO 2004/05 6610 describes a structural element of the aforesaid type in which the metal body is a tube and the anchor patterns are provided in the form of openings made in the tube.

However the openings made in the tube reduce the mechanical strength of the tube and, as a consequence, the structural element.

SUMMARY OF THE INVENTION

One object of the invention is to provide a hybrid structural element having improved mechanical strength.

For this purpose the invention provides a structural element of the aforesaid type characterised in that the anchor pattern projects from the external surface of the metal body, the anchor pattern being closed and of one material with the metal body, and having an undercut in relation to the external surface of the metal body.

According to other embodiments the structural element comprises one or more of the following characteristics, taken in isolation or in all technically possible combinations:

- the anchor pattern comprises a base linking to the metal body, and an edge projecting in relation to the base, the edge having a face which is undercut in relation to the external surface of the metal body,
- the edge is formed by a fold in the anchor pattern,
- the edge is shaped at one free extremity of the anchor pattern opposite the metal body,
- the edge has a peripheral contour which is substantially circular or oblong,
- the undercut surface together with a region of the external surface of the metal body adjacent to the base forms a passageway through which the body of plastics material extends,
- the metal body is elongated and comprises at least two anchor patterns formed on opposite walls of the metal body,
- the structural element is an element of the front of a vehicle.

The invention also relates to a motor vehicle comprising a structural element as defined above.

The invention further relates to a process for manufacturing a structural element as defined above in which a precursor of the anchor pattern projecting from the external surface of the metal body is formed in a stage of forming the metal body by positioning the metal body in a mould and introducing a fluid under pressure within the metal body, and the precursor is deformed to obtain the anchor pattern provided with the undercut.

Advantageously, the precursor is formed by crushing it in such a way as to form a fold having an undercut surface with respect to the external surface of the metal body.

BRIEF DESCRIPTION OF THE DRAWING FIGURES

Other advantages and characteristics of the present invention will become clear from the following detailed description which is given with reference to the appended drawings which are provided purely by way of non-limiting example and in which:

FIGS. 4 to 7 illustrate stages in the process of manufacturing the front in FIG. 1.

DETAILED DESCRIPTION OF THE INVENTION

In everything which follows the orientations are the normal orientations for a motor vehicle.

Figure 1:
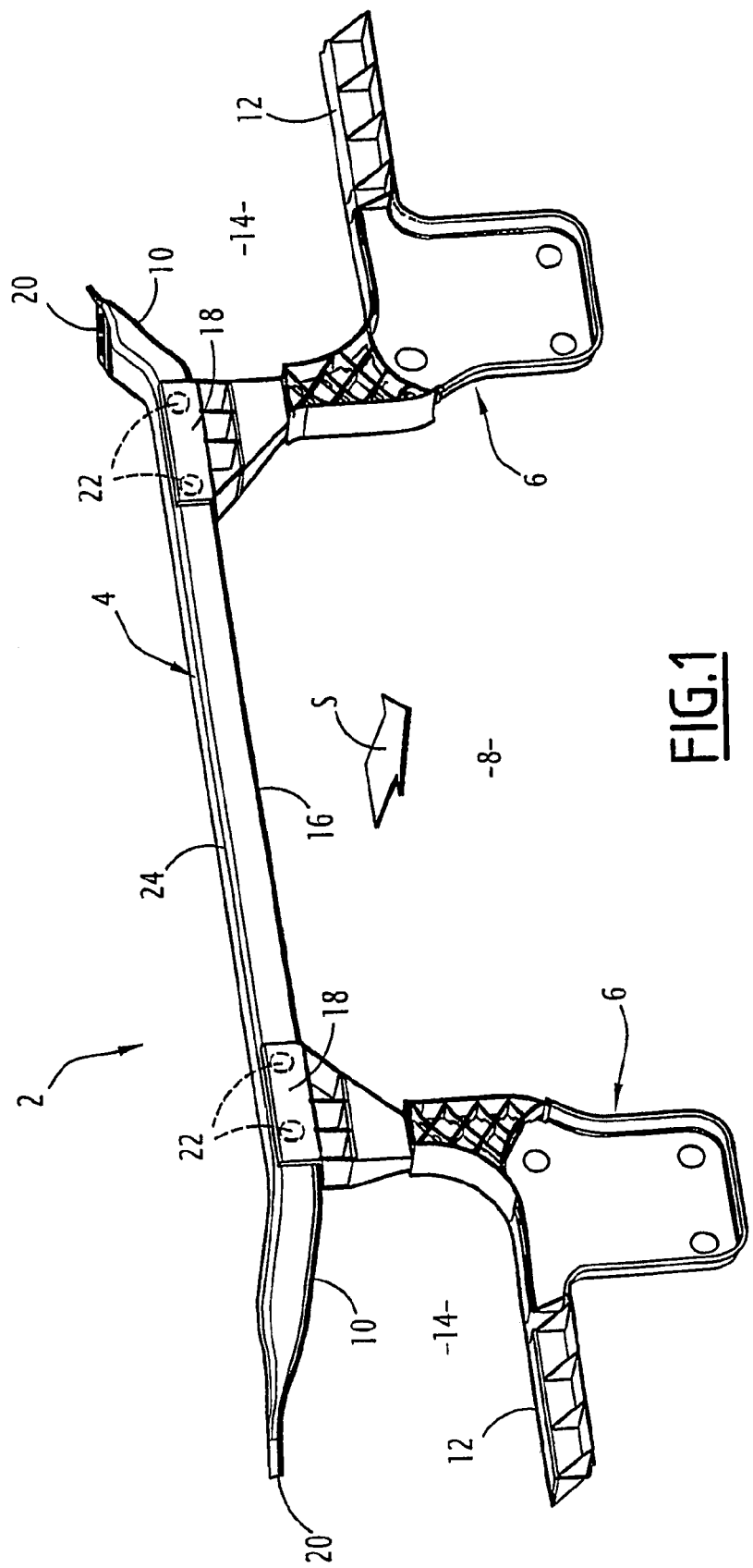
FIG. 1 is a diagrammatical perspective view of a front for a motor vehicle according to the invention.

Thus the terms "front", "rear", "right", "left", "upper" and "lower" are to be understood with respect to the driver's position and in the direction in which the vehicle moves forward shown by an arrow S in FIG. 1.

As shown in FIG. 1, front 2 comprises an upper tubular metal cross-member 4 extending substantially horizontally and two lateral uprights of plastics material 6 extending substantially vertically.

The two lateral uprights 6 are spaced laterally from one another and extend cross-member 4 downwards.

Such a front 2 is intended to be mounted on the front of a motor vehicle to support various items of equipment such as optical units, an engine fan unit, a radiator, a condenser, etc.

Thus uprights 6 form between them a central space 8 to receive for example a radiator, a condenser and an engine fan unit.

Likewise lateral end portions 10 of cross-member 4 together with branches 12 extending uprights 6 laterally outwards define spaces 14 to receive optical units.

Cross-member 4 comprises a substantially straight central portion 16 extending between end portions 10.

End portions 10 are inclined with respect to central portion 16, and extend rearwards and laterally outwards.

Upper end portions 18 of uprights 6 are fixed to central portion 16 close to end portions 10.

Front 2 is substantially symmetrical with respect to a median vertical plane. Only the right hand part (on the left in FIG. 1) in front 2 will be described in detail below.

Figure 2:
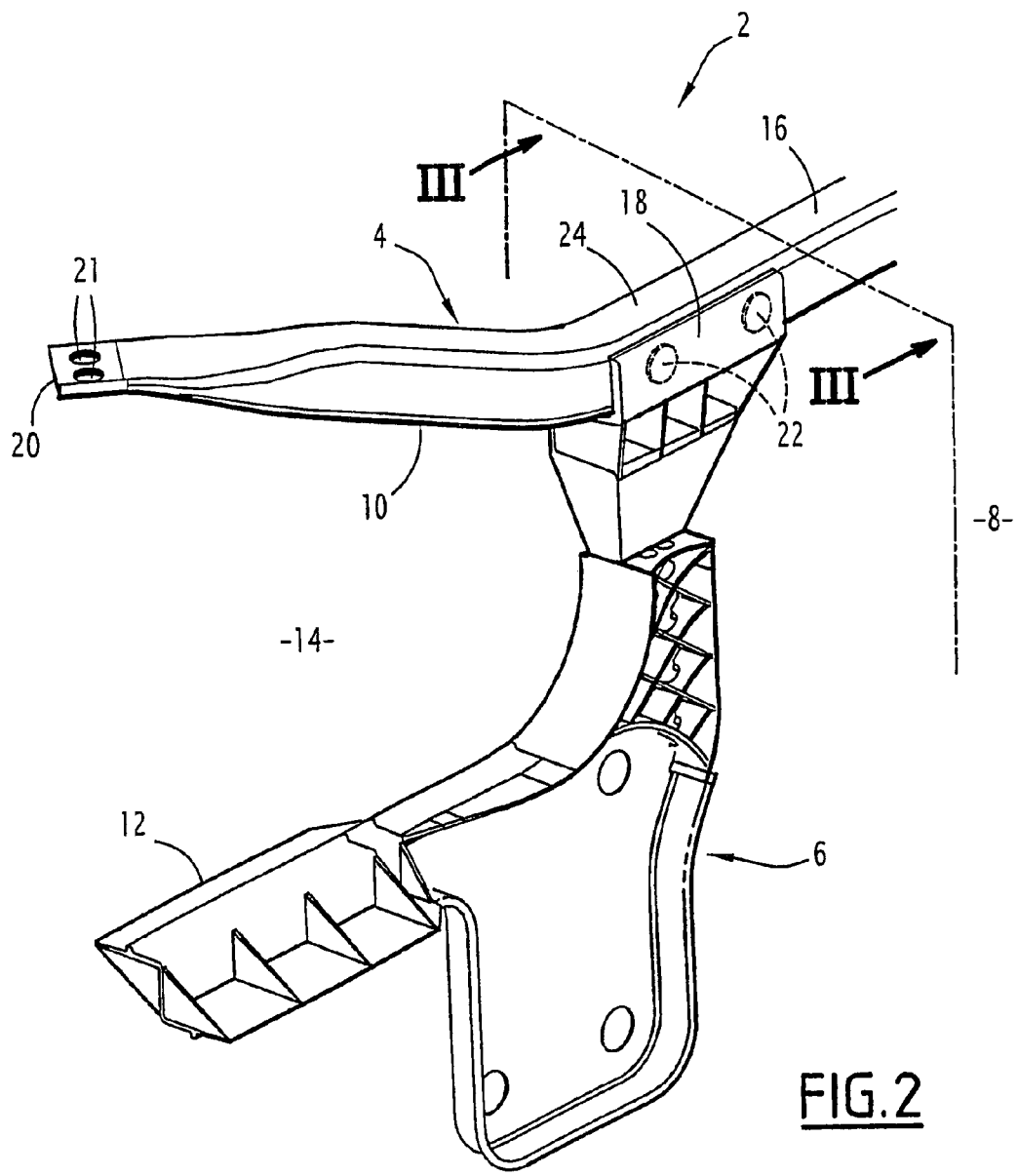
FIG. 2 is a diagrammatical perspective partial magnified view of the front in FIG. 1.

As shown in FIG. 2, the right end portion 10 has a free extremity 20 which is flattened by crushing cross-member 4.

Extremity 20 is provided with two spaces 21 to receive fixing members for cross-member 4 onto the structure of the motor vehicle, for example bolts or screws (not shown).

Extremity portion 18 of the right upright 6 is overmoulded onto cross-member 4 covering anchor patterns 22, represented by dashed lines, projecting from the external surface 24 of cross-member 4 in order to connect right upright 6 to cross-member 4.

Figure 3:
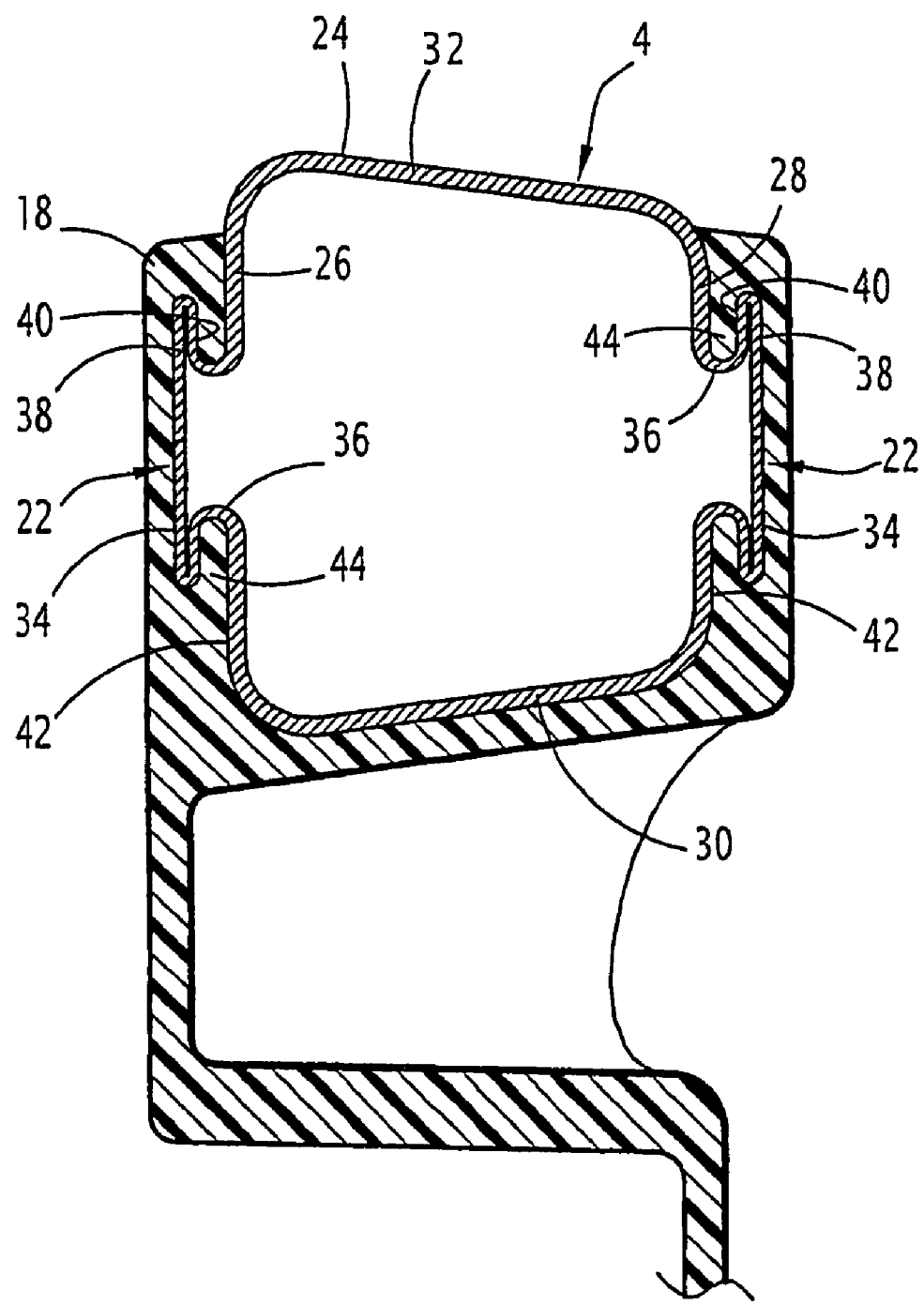
FIG. 3 is a view in partial cross-section along III-III of the front of FIGS. 1 and 2.

As shown in FIG. 3, which is a cross-sectional view in a plane perpendicular to a longitudinal direction of central portion 16, cross-member 4 has a substantially trapezoidal closed quadrangular cross-section defined by four substantially flat walls 26, 28, 30, 32 connected together by rounded corners.

More specifically, cross-member 4 comprises a rear wall 26 and a front wall 28 which are parallel and substantially vertical, connected together by lower wall 30 and an upper wall 32 which converge in a forward direction.

Anchor patterns 22 are formed on each of rear wall 26 and front wall 28.

Each pattern 22 is of one piece with corresponding wall 26, 28 and is closed, that is to say there is no opening between the interior and the exterior of cross-member 4, which maintains the mechanical strength of cross-member 4.

Each pattern 22 is obtained for example by deforming corresponding wall 26, 28 as will be more particularly explained below.

At one extremity opposite corresponding wall 26, 28 each pattern 22 has a flat circular head 34 substantially parallel to corresponding wall 26, 28 and a circular base 36 connecting head 34 to corresponding wall 26, 28.

Head 34 of each pattern 22 is larger than base 36 and has a peripheral edge 38 which projects in relation to base 36. As will be better explained below, each edge 38 is formed from a fold of material.

Edge 38 has a face 40 which substantially faces a region 42 of outer surface 24 bordering base 36. Face 40 is for example substantially parallel to corresponding region 42.

With corresponding region 42 face 40 forms an annular passage 44 around the base 36 of pattern 22.

Face 40 is undercut and provides anchor for the plastics material comprising extremity portion 18 to external surface 24.

In fact extremity portion 18 of upright 6 should cover the rear wall 26, front wall 28 and lower wall 30 of cross-member 4, upper wall 32 being uncovered.

On rear wall 26 and front wall 28 extremity portion 18 covers patterns 22 enveloping heads 34 and penetrates spaces 44 to ensure a strong anchor between straight upright 6 and cross-member 4.

The anchor is strong because of the presence of undercut faces 40 and projections 22 on opposing front wall 26 and rear wall 28 of cross-member 24.

Anchor of the plastics material to the external surface 24 on closed patterns 22 simplifies overmoulding preventing the plastics material from penetrating within cross-member 4 and filling it.

Returning to FIG. 2, cross-member 4 comprises two sets of patterns 22 spaced laterally on both its rear face 26 (not visible) and front face 28, each assembly permitting the anchor of an upright 6.

Each assembly comprises two laterally spaced patterns 22 on front wall 26 and two laterally spaced patterns 22 on rear wall 28 (FIG. 3).

Spaced patterns 22 improve the anchor of each upright 6 to cross-member 4.

In a variant, cross-member 4 comprises two abutting lengths of metal tube, an upright 6 being attached to each length.

A process for the manufacture of front 2 will be described with reference to FIGS. 4 to 7.

As illustrated in FIG. 4, cross-member 4 initially has a trapezoidal transverse cross-section with smooth walls 26, 28, 30, 32.

Cross-member 4 is located between two parts 50, 52 of a mould, forming between them a cavity 54 which has a shape corresponding to the desired shape of cross-member 4.

Cavity 54 has a cross-section of general shape substantially similar to that of cross-member 4, but of slightly larger dimensions.

Cavity 54 has externally converging frustoconical recesses 56 located opposite the future locations of patterns 22 on rear wall 26 and front wall 28.

In a manner which is in itself known, and as illustrated in FIG. 5, a pressurised liquid is introduced within cross-member 4 in the course of a hydroforming stage.

The pressurised liquid deforms and presses cross-member 4 against the inner walls of cavity 54 so that cross-member 4 adopts the shape of cavity 54.

Cross-member 4 is slightly deformed in regions where cavity 54 has a cross-section which is substantially similar to that of cross-member 4.

At recesses 56, walls 26, 28 of cross-member 4 are deformed to a greater extent.

After the hydroforming stage cross-member 4 has pattern precursors 58 at recesses 56 which project outwards from walls 26 and 28, precursors 58 being slightly frustoconical and tapering outwards.

Frustoconical precursors 58 allow parts 50, 52 to be opened so that they can be released from cross-member 4 as illustrated in FIG. 6.

Because they have suffered more deformation than the rest of cross-member 4 precursors 58 have a wall thickness which is less than that of the rest of cross-member 4.

Subsequently, as illustrated in FIG. 7, precursors 58 are deformed using punches 60 applied to the free end of each precursor 58 in order to crush it towards corresponding wall 26, 28.

Precursors 58, with thinner walls, deform preferentially and are crushed so as to form flattened heads 34 and edges 38. Edge 38 of each pattern 22 comprises a joined fold of material resulting from the crushing of corresponding precursor 58.

Preferably extremities 20 of cross-member 4 are kept open so that a fluid can be introduced into cross-member 4 during the hydroforming stage, and are flattened subsequent to the hydroforming stage.

Extremity portions 10 may be bent either before or after the hydroforming stage.

Uprights 6 are overmoulded onto cross-member 4 once patterns 22 have been formed.

This process of manufacture makes it possible to easily obtain cross-member 4 having a closed cross-section provided with closed patterns 22 projecting outwards, and having undercuts.

Figure 8:
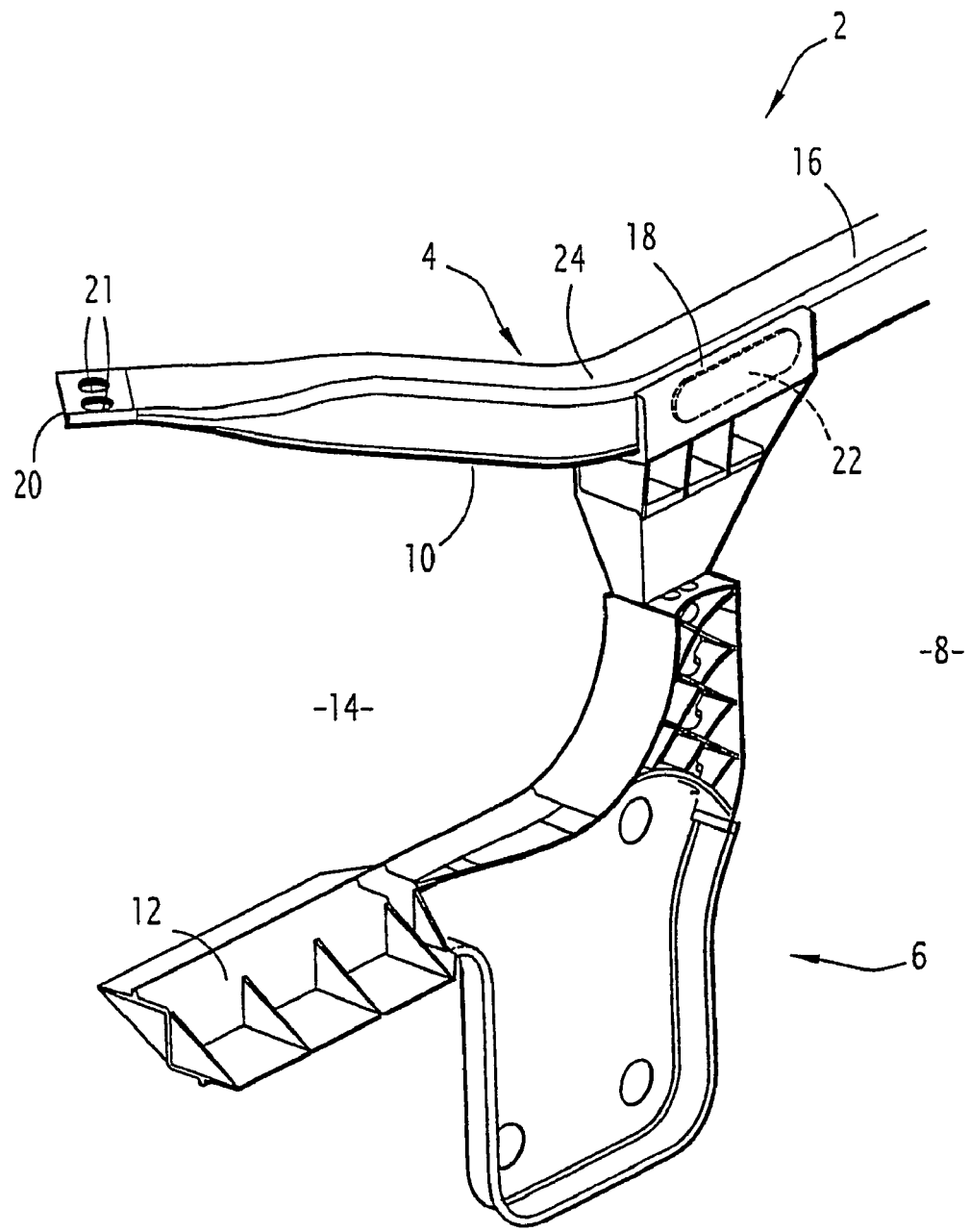
FIG. 8 is a view similar to that in FIG. 2 illustrating a variant of a front.

In a variant, patterns 22 have a different contour. For example, as illustrated in FIG. 8, a pair of patterns spaced transversely is replaced by a single pattern 22 having an elongated preferably oblong shape in a longitudinal direction of cross-member 4 with an oblong peripheral edge.

The invention applies to the fronts of motor vehicles and more generally to any other type of structural element in a motor vehicle.

The invention claimed is:

1. A process for manufacture of a structural element, the structural element comprising:

at least one hollow metal body (4) having a closed cross-section with an external surface (24) and at least one anchor pattern (22) formed on the external surface (24), and at least one body of plastics material (6) overmoulded onto the metal body (4), the body of plastics material (6) covering the external surface (24) of the metal body (4) in such a way as to at least partly cover the anchor pattern (22) to link the body of plastics material (6) to the metal body (4), wherein the anchor pattern (22) projects from the external surface (24) of the metal body (4), the anchor pattern (22) being closed and of one material with the metal body (4) and having an undercut (40) in relation to the external surface (24) of the metal body, the process comprising:

forming a precursor (58) of the anchor pattern (22) projecting from the external surface (24) of the metal body (4) during a stage of forming the metal body (4) by positioning the metal body (4) in a mould (50, 52) and introducing a pressurised fluid within the metal body (4), and deforming the precursor (58) in order to obtain the anchor pattern (22) provided with the undercut.

2. The process of manufacture according to claim 1, wherein the precursor (58) is deformed by crushing the precursor (58) in such a way as to form a fold (38) provided with a face (40) which is undercut in relation to the external surface (24) of the metal body (4).

3. A process for the manufacture of a structural element for a motor vehicle, comprising:

forming a precursor (58) of an anchor pattern (22) projecting from an external surface (24) of at least one hollow metal body (4) during a stage of forming the metal body (4) by positioning the metal body (4) in a mould (50, 52);

introducing a pressurised fluid within the metal body (4); and deforming the precursor (58) in order to obtain the anchor pattern (22) provided with the undercut, wherein the structural element comprises:

the at least one hollow metal body (4) having a closed cross-section with an external surface (24) and at least one anchor pattern (22) formed on the external surface (24), and at least one body of plastics material (6) overmoulded onto the metal body (4), the body of plastics material (6) covering the external surface (24) of the metal body (4) in such a way as to at least partly cover the anchor pattern (22) to link the body of plastics material (6) to the metal body (4), wherein the anchor pattern (22) projects from the external surface (24) of the metal body (4), the anchor pattern (22) being closed and of one material with the metal body (4) and having an undercut (40) in relation to the external surface (24) of the metal body, and the precursor (58) is deformed by crushing the precursor (58) in such a way as to form a fold (38) provided with a face (40) which is undercut in relation to the external surface (24) of the metal body (4).

* * * * *